May 22, 1928.

G. T. COOKE 1,670,652

LOCKING MEANS FOR PINS, BOLTS, AND THE LIKE

Filed Jan. 11, 1928

INVENTOR.
George T. Cooke
BY
Mitchell & Bichert
ATTORNEYS.

Patented May 22, 1928.

1,670,652

UNITED STATES PATENT OFFICE.

GEORGE T. COOKE, OF SOUTH NORWALK, CONNECTICUT.

LOCKING MEANS FOR PINS, BOLTS, AND THE LIKE.

Application filed January 11, 1928. Serial No. 245,974.

My invention relates to certain new and useful improvements in locking means for pins, bolts, and the like, by the use of cotter keys, so called.

In the use of cotter keys as a lock for pins and bolts, disaster is sometimes experienced, by reason of the fact that workmen occasionally fail to spread the ends of the key, with the result that it falls out of place. In railroad work, for example, it is highly important that when cotter keys are so employed, the free ends should in every instance be spread so that this danger will be entirely avoided.

One object of the present invention is to provide a construction whereby when the cotter key is applied to the pin or bolt, the very act of applying the same will cause the cotter key ends to be properly spread so as to lock the cotter pin in place.

The invention will be clearly understood from a reading of the following specification and an examination of the accompanying drawings, in which—

Figure 1:
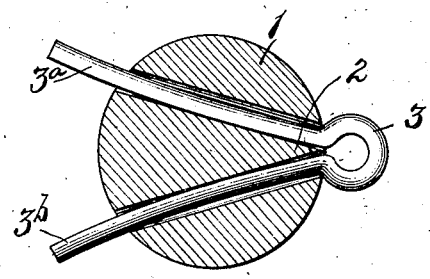
Fig. 1 is a cross-section of a pin with the cotter key in place, the pin being constructed to embody my invention.
Figure 2:
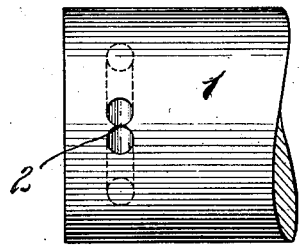
Fig. 2 is a side elevation of the end of the pin shown in Fig. 1, with the cotter key removed.

In Figs. 1 and 2, 1 represents the body of the pin to which the cotter key is to be applied. Extended through the body of the pin 1 are two passages arranged at an angle to each other and emerging at one side of the pin closely adjacent to each other, so as to form in effect a wedge 2 closely adjacent to the surface of the pin 1. 3 is the head of a cotter key. $3^a$ and $3^b$ are the two ends or legs of said key. When the cotter key is applied, the two legs are inserted into the passages aforesaid so that the wedge 2 will enter between the legs, whereupon, as the cotter key is pushed in, these legs $3^a$, $3^b$ will be spread apart at an angle as shown in Fig. 1, the effect being to put a kink or bend in the two legs so that when the cotter key is pushed fully into place it will, without any further manipulation or without upsetting or bending the exposed ends, be securely retained, so as to function for its intended purpose with certainty and without danger of being jarred out of place.

Figure 3:
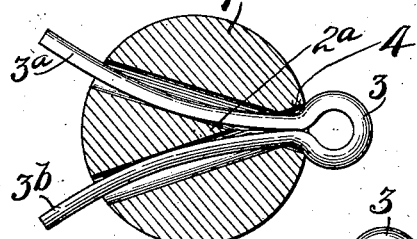
Fig. 3 is a view similar to Fig. 1 showing a modification.
Figure 4:
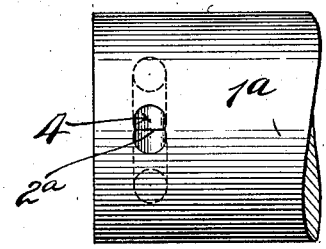
Fig. 4 is a side view of Fig. 2 with the cotter key removed.

In Figs. 3 and 4, I have arranged the two bores through the pin $1^a$ so that they cross each other. This has the effect of forming the wedge $2^a$ at a point well inside the body of the pin instead of near the surface, and this has the further advantage of providing a relatively elongated recess, which appears at 4 in Fig. 4, into which part of the head 3 of the cotter key may extend to such a degree as to resist twisting and shearing strain (see Fig. 3). The legs $3^a$, $3^b$, as before, are spread apart on opposite sides of the wedge $2^a$, and are at the same time kinked or bent as shown, so as to prevent all possibility of accidental dislodgement of the cotter key when it is once applied and driven fully into place.

Figure 5:
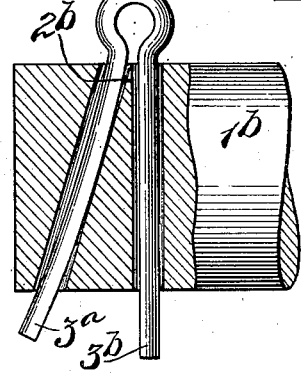
Fig. 5 is a view of one end of the pin, partly broken away and in section, to illustrate another modification.
Figure 6:
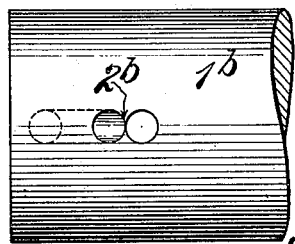
Fig. 6 is a side view of the pin end shown in Fig. 5 with the cotter key removed.

In Figs. 5 and 6 I have shown a modification in which $1^b$ represents the pin which is to be held by the cotter key. Here again I use only two bores, both of which extend diametrically through the pin and substantially in the plane of the central axis of the pin. One of these bores preferably extends through the pin $1^b$ at substantially right angles, while the other bore is oblique thereto. In the drawing, the leg $3^b$ of the cotter key stands in the right angle bore, while the leg $3^a$ stands in the oblique bore. The mere spreading of the legs of the key bends one leg at least so as to hold the key in place, even though the exposed ends of the legs are not bent over.

It will be noted that in all of the above modifications I provide only two bores. Heretofore, there have been pins of this type constructed in which three separate boring operations have been required for the reception of the cotter key. By the present invention one of these three boring operations is entirely avoided, and a very substantial saving is accomplished thereby without sacrifice of either efficiency or safety.

In the form shown in Figs. 3 and 4 an added advantage is attained, in that an elongated pocket is formed into which a part of the eye of the cotter key may extend to resist twisting strain, and, incidentally, to better resist shearing action.

By the term "pin" as used in the claims I intend to include of course a bolt or the like.

What I claim is:—

1. A pin, two straight cotter key passages formed therein at an angle to each other, each passage extending entirely through said pin one end of one passage terminating at a point adjacent to the corresponding end of the other passage, and a wedge formed between said bores for spreading the ends of a cotter key.

2. A pin, two straight cotter key passages formed therein at an angle to each other, each passage extending entirely through said pin, said passages crossing each other at a point adjacent to one side of the pin to form an elongated opening at the surface of the pin and a wedge between the bores for spreading the ends of a cotter key.

GEORGE T. COOKE.